United States Patent
Radion et al.

(10) Patent No.: US 10,703,330 B2
(45) Date of Patent: Jul. 7, 2020

(54) RESTRAINT HARNESS ATTACHED TO A MAIN SUPPORT STRUCTURE OF A VEHICLE

(71) Applicant: GM Global Technology Operations LLC, Detroit, MI (US)

(72) Inventors: Stephanie C. Radion, Bloomfield Hills, MI (US); Sarah E. Smith, Harrison Township, MI (US); Samuel Derian, Detroit, MI (US); Wonhee M. Kim, Royal Oak, MI (US); Daniel W. Booth, Troy, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/161,793

(22) Filed: Oct. 16, 2018

(65) Prior Publication Data
US 2020/0114863 A1    Apr. 16, 2020

(51) Int. Cl.
*B60R 22/26* (2006.01)
*B60R 22/10* (2006.01)
*B60R 22/14* (2006.01)

(52) U.S. Cl.
CPC ............ *B60R 22/26* (2013.01); *B60R 22/105* (2013.01); *B60R 22/14* (2013.01)

(58) Field of Classification Search
CPC ....... B60R 22/26; B60R 22/105; B60R 22/14; B60R 22/00
USPC ......................................... 297/468, 464, 465
See application file for complete search history.

(56) References Cited

U.S. PATENT DOCUMENTS

| | | | | |
|---|---|---|---|---|
| 3,495,849 A | * | 2/1970 | Cetrone | B60R 22/26 297/485 |
| 3,499,681 A | * | 3/1970 | O'Neal | B60R 22/14 297/465 |
| 4,759,569 A | * | 7/1988 | Potter | B60R 21/18 280/748 |
| 5,704,684 A | * | 1/1998 | Dukatz | B60N 2/3084 297/238 |
| 5,746,395 A | * | 5/1998 | Peck | B64D 25/04 244/121 |
| 8,820,789 B2 | * | 9/2014 | Merrill | B60N 2/24 280/806 |
| 9,764,662 B1 | * | 9/2017 | Ramos Valencia | B60N 2/3084 |
| 10,144,381 B2 | | 12/2018 | Faruque et al. | |
| 2012/0242134 A1 | * | 9/2012 | Siegel | B60R 22/14 297/465 |
| 2013/0187421 A1 | * | 7/2013 | Foye | B60R 22/024 297/232 |

(Continued)

FOREIGN PATENT DOCUMENTS

| | | |
|---|---|---|
| DE | 4431658 C2 | 3/1996 |
| GB | 2023415 A | 1/1980 |

*Primary Examiner* — Mark R Wendell (57) ABSTRACT

A restraint harness for a vehicle is disclosed. The vehicle includes a seat having a structural support that is attached to a main support structure of the vehicle. The restraint harness includes a body constructed of a restraint material. The body is shaped to secure an occupant body. The restraint material is configured to withstand loads exerted upon the restraint harness by the occupant during operation of the vehicle. The restraint harness also includes an attachment portion that is configured to attach to the structural support of the seat.

16 Claims, 9 Drawing Sheets

(56) References Cited

U.S. PATENT DOCUMENTS

| | | | |
|---|---|---|---|
| 2015/0175035 A1* | 6/2015 | Balensiefer, II | B60N 2/2812 297/256.15 |
| 2018/0319360 A1* | 11/2018 | Clyde | B60N 2/012 |

* cited by examiner

RESTRAINT HARNESS ATTACHED TO A MAIN SUPPORT STRUCTURE OF A VEHICLE

INTRODUCTION

The present disclosure relates to a restraint harness for an occupant in a vehicle. More particularly, the disclosure relates to a restraint harness attached to a main support structure of the vehicle.

Many individuals use mobile computing devices such as smartphones to locate car-for-hire or ride-sharing services. However, the vehicles used in these types of car-for-hire or ride-sharing services typically do not include a child restraint or safety seat to accommodate a small child such as a toddler. As a result, when individuals ride in one of these vehicles they need to provide their own child safety seat in the event a small child accompanies them.

Child safety seats are large and bulky, which makes it inconvenient for individuals to carry these seats from place to place. Furthermore, many individuals struggle or find it time-consuming to properly install a child safety seat in a vehicle. Most ride-sharing services do not include a child seat in their vehicle, since child seats occupy an entire seat that could be used to accommodate an adult instead. As a result, it is inconvenient for individuals to use ride-sharing services when accompanied by small children.

Thus, while current child safety seats achieve their intended purpose, there is a need for a new and improved system and method for a child safety seat for vehicles used in ride-sharing services.

SUMMARY

According to several aspects, a restraint harness for a vehicle is disclosed. The vehicle includes a seat having a structural support that is attached to a main support structure of the vehicle. The restraint harness includes a body constructed of a restraint material. The body is shaped to secure an occupant body and the restraint material is configured to withstand loads exerted upon the restraint harness by the occupant during operation of the vehicle. The restraint harness also includes an attachment portion that is configured to attach to the structural support of the seat.

In another aspect of the disclosure, the attachment portion of the restraint harness is a tongue.

In yet another aspect of the disclosure, the restraint harness further includes a receiver, where the tongue of the restraint harness is releasably attached to the receiver.

In still another aspect of the disclosure, the receiver is configured to attach to a seat shell. The seat shell is the structural support of the seat.

In another aspect of the disclosure, the attachment portion of the restraint harness is a portion of the restraint material.

In yet another aspect of the disclosure, the attachment portion of the restraint harness is configured to pass through an internal portion of a spine member. The spine member is the structural support of the seat.

In still another aspect of the disclosure, the restraint harness is a tensioning element configured to pass through the internal portion of the spine member.

In another aspect of the disclosure, the tensioning element is configured to constrict or expand the body of the restraint harness.

In another aspect of the disclosure, the restraint harness further includes a pair of substantially vertical supports, and the body of the restraint harness extends between the substantially vertical supports.

In yet another aspect of the disclosure, the substantially vertical supports are the attachment portion of the restraint harness.

In still another aspect of the disclosure, the body of the restraint harness defines a plurality of openings configured to accommodate appendages of the occupant.

In another aspect of the disclosure, the restraint harness further includes a cable tightening system configured to constrict and expand the body of the restraint harness.

In yet another aspect of the disclosure, the tensioning element is a continuous loop extending around an outer periphery of the body of the restraint harness.

In still another aspect of the disclosure, the restraint harness further includes two tensioning elements. One of the tensioning elements are arranged into a first loop configured to adjust a groin area and a second tensioning element is arranged into a second loop configured to adjust a shoulder area of the body of the restraint harness.

In another aspect of the disclosure, the restraint harness is configured to actuate from a stowed position and into a deployed position. The restraint harness is accessible when in the deployed position.

In yet another aspect of this disclosure, the restraint harness is configured to actuate from the deployed position and back into the stowed position. The restraint harness is no longer accessible when in the stowed position.

In still another aspect of the disclosure, the restraint harness is a child restraint harness.

In another aspect of the disclosure, the restraint harness is configured to actuate into a stowed position by constricting into a bight line of the seat.

In yet another aspect of the disclosure, the restraint is configured to actuate back into the deployed position by extending upwardly and out of the bight line of the seat.

According to another aspect of this disclosure, vehicle is disclosed. The vehicle includes a seat having a structural support that is attached to a main support structure of the vehicle. The vehicle also includes a child restraint harness attached to the structural support of the vehicle. The child restraint harness is configured to actuate from a stowed position and into a deployed position and is accessible when in the deployed position. The child restraint harness is configured to actuate from the deployed position and back into the stowed position and is no longer being accessible when in the stowed position. The child restraint harness includes a body constructed of a restraint material. The body is shaped to secure a child's body and the restraint material is configured to withstand loads exerted upon the restraint harness by the occupant during operation of the vehicle. The child restraint harness also includes an attachment portion that is configured to attach to the structural support of the seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
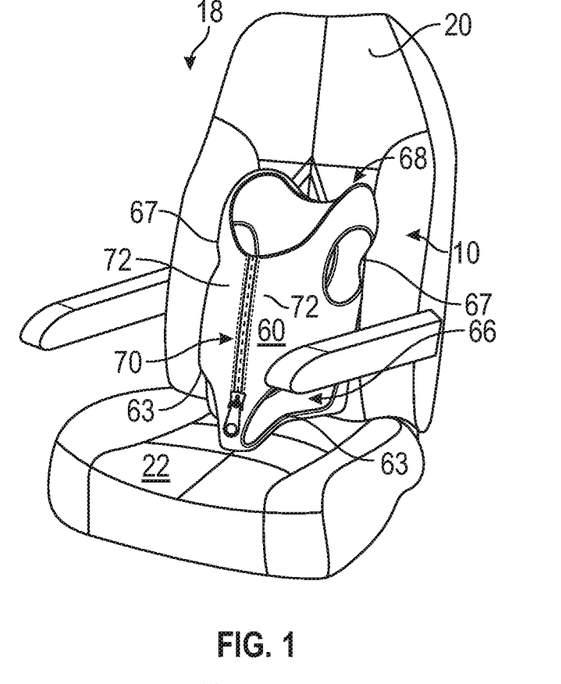
FIG. 1 is an illustration of a restraint harness attached to a vehicle seat, where the restraint harness is in a deployed position according to an exemplary embodiment.
Figure 2:
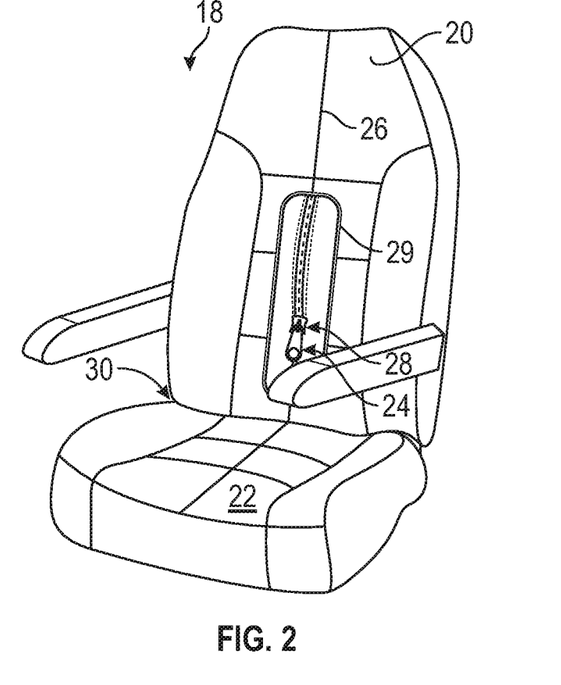
FIG. 2 is an illustration of the vehicle seat shown in FIG. 1, where the restraint harness is in a stowed position and is placed within the vehicle seat though an opening along a seam in the seat back according to an exemplary embodiment.

Referring to FIG. 1, a restraint harness 10 for a seat 20 of a vehicle 18 is shown. Specifically, the restraint harness 10 is in an in-use position, which is referred to as a deployed position. When in the deployed position, the restraint harness 10 is positioned outside of the seat 20, and rests upon an outer surface or seat trim 22 of the seat 20. However, when the restraint harness 10 is not in use or is not needed the restraint harness 10 may constrict and be placed within the seat 20, which is shown in FIG. 2. When placed within the seat 20, the restraint harness 10 no longer occupies space that may be used to seat a passenger. The position of the restraint harness 10 seen in FIG. 2 is referred to as a stowed position. In one non-limiting embodiment, the restraint harness 10 is configured to actuate from the stowed position and into the deployed position, where the restraint harness 10 is now available for access by an operator. Similarly, when the restraint harness 10 is no longer needed, the restraint harness 10 is configured to actuate from the deployed position and back into the stowed position, where the restraint harness 10 is no longer accessible by the operator. Several approaches for actuating the restraint harness 10 are explained below.

Figure 6:
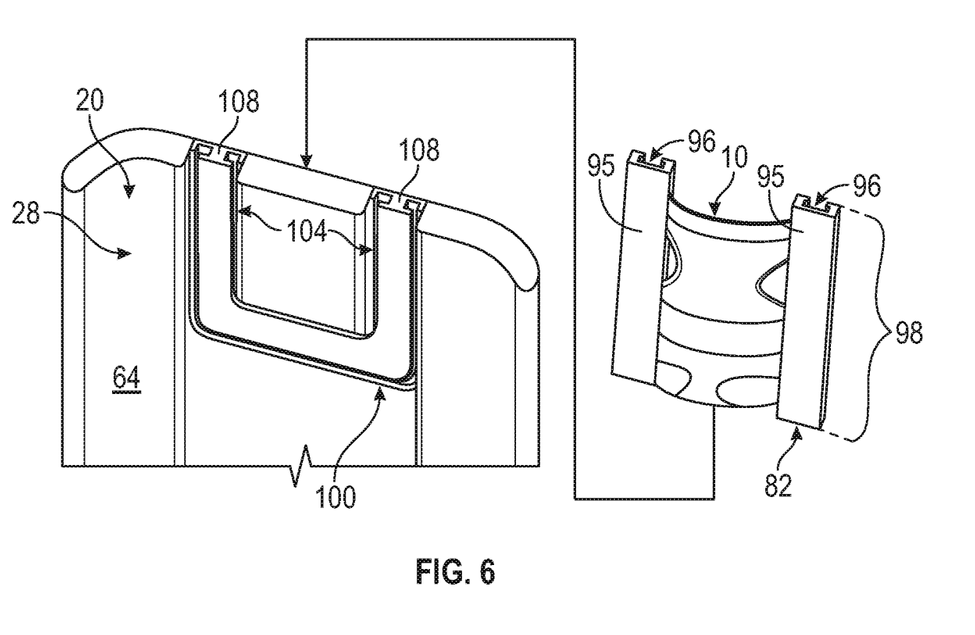
FIG. 6 illustrates an alternative approach to attach the restraint harness, where the restraint harness is slidably engaged with the structural support of the seat according to an exemplary embodiment.

In the non-limiting embodiment as shown in FIG. 2, an opening 24 is located along a seam line 26 along a back 28 of the seat 20. The restraint harness 10 is first placed within the seat 20 through the opening 24. The opening 24 is then closed by a fastener 29, thereby placing the restraint harness 10 into the stowed position. In the exemplary embodiment as shown the fastener is a zipper, however other fastening approaches may be used instead. Moreover, it is to be appreciated that the restraint harness 10 may also be stowed along a seat bight line 30 (shown in FIG. 3A) instead. Furthermore, in an alternative embodiment, which is shown in FIG. 6, the restraint harness 10 may not include a stowed position. In other words, the restraint harness 10 is always available for use to secure an occupant.

In the embodiments as illustrated in the figures, the restraint harness 10 is a child restraint harness for an automobile. More specifically, the restraint harness 10 is shaped to secure a toddler (i.e., a child older than two years old and that weighs less than about forty pounds). However, it is to be appreciated that the restraint harness 10 is not limited to small children. That is, in another embodiment, the restraint harness 10 is larger, and is sized to fit adults instead of small children. For example, the restraint harness 10 may be used to accommodate an adult with special needs. Moreover, in an embodiment the vehicle 18 is an automobile such as a car, van, or sport utility vehicle. The vehicle 18 may be any device for transporting passengers and is not limited to automobiles. For example, in another embodiment the vehicle 18 may be an aircraft.

Figure 3A:
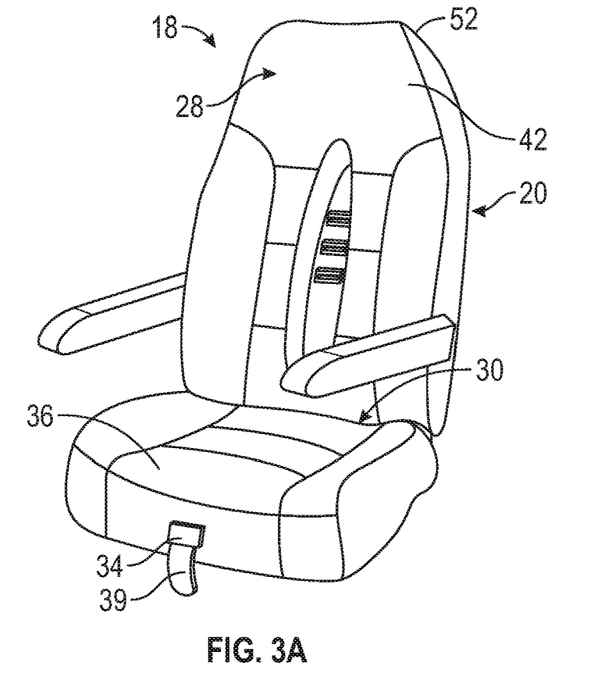
FIG. 3A illustrates an alternative embodiment where the restraint harness is stored in a bight line of the vehicle seat according to an exemplary embodiment.
Figure 3B:
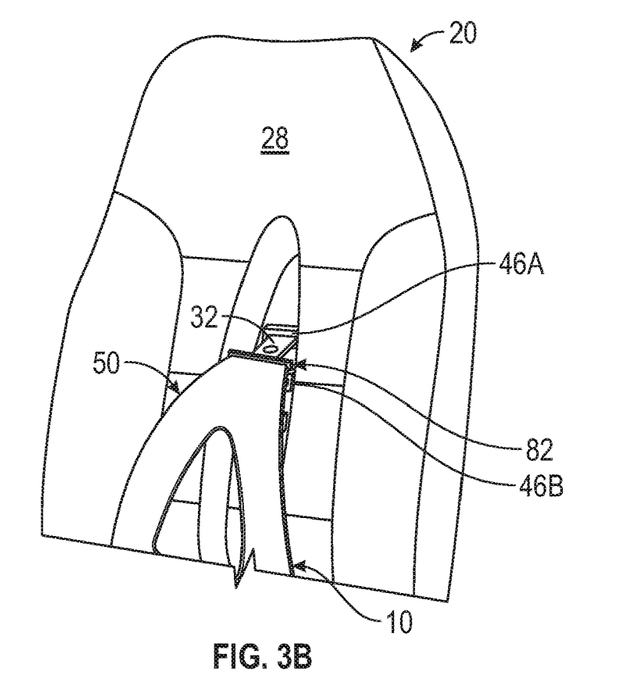
FIG. 3B is an enlarged view of a portion of a seat back shown in FIG. 3A, where one of a series of buckles disposed along the seat back secures a tongue of the restraint harness according to an exemplary embodiment.
Figure 3C:
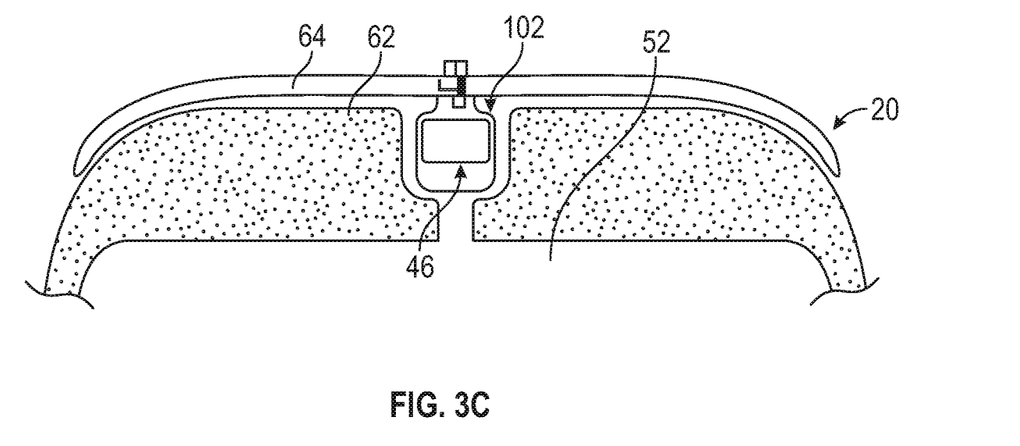
FIG. 3C illustrates an rearmost surface of the seat, where an alternative approach for securing the restraint harness is employed according to an exemplary embodiment.

FIGS. 3A, 3B, and 3C illustrate the restraint harness 10 in the stowed position using an alternative approach. Specifically, instead of the opening 24 along the back 28 of the seat 20, the restraint harness 10 is received and stored in the bight line 30 of the seat 20. The seat bight line 30 is the intersection between a seat bottom cushion 36 and a seat back cushion 42. FIG. 3A illustrates the restraint harness 10 in the stowed position, and FIG. 3B is an enlarged view of a portion of the restraint harness 10 in the deployed position. Specifically, when the restraint harness 10 is in the deployed position, the restraint harness 10 is releasably attached to a seat shell 64 (visible in FIGS. 3C and 4) at the back 28 of the seat 20 by a fastening device such as a tongue 32, which is part of a latching system including one or more latches 46 configured to releasably secure the tongue 32. A release mechanism 34 (FIG. 3A) is actuated to urge the restraint harness 10 from the stowed position (FIG. 3A) into the deployed position (FIG. 3B). FIG. 3A also illustrates an actuation mechanism 39 for pulling the restraint harness 10 from the deployed position back into the stowed position. In the non-limiting embodiment as shown, the release mechanism 34 is a push button and the actuation mechanism 39 is a pull strap, however other devices may be used instead.

Referring to FIGS. 3A and 3B, in one embodiment a plurality of latches 46 are arranged in a longitudinal direction along the back 28 of the seat 20. The latches 46 are each fixedly attached to the seat shell 64 (seen in FIGS. 3C and 4). The tongue 32, which is disposed on an end portion 50 of the restraint harness 10, is received and secured by one of the latches 46. The latches 46 are each configured to latch and secure the tongue 32. Thus, the restraint harness 10 may be deployed from the bight line 30, and then tongue 32 located at the end portion 50 of the restraint harness 10 attaches to one of the latches 46. An operator (e.g., an adult who is securing a child into the restraint harness 10) determines the specific latch 46 the tongue 32 may engage with based on the height of the child. For example, a relatively short child would be secured by the lower latch 46B, but as the child grows and increases in height, eventually latch 46A would be used instead.

Although the latches 46 are shown located along the back 28 of the seat 20 along the seat trim 22, it is to be appreciated that is illustration is merely exemplary in nature, and that restraint harness 10 may be releasably attached to the seat shell 64 using a number of different approaches. For example, FIG. 3C illustrates another embodiment where the latch 46 is located along a rearmost surface 52 of the seat 20. The latch 46 is fixedly attached to the seat shell 64. The seat shell 64 located directly underneath the seat foam 62.

Referring to FIG. 1, the restraint harness 10 includes a shell or body 60 constructed of a restraint material. The body 60 of the restraint harness 10 is shaped to secure a body of the occupant, and in one embodiment the restraint harness 10 may secure the occupant's shoulders, torso, and groin area. In other words, the body 60 of the restraint harness 10 swaddles or envelopes at least a portion of the occupant's shoulders, torso, and groin area. As a result, any loads created by the occupant in response to sudden movement of the vehicle are distributed substantially evenly around the occupant's lower body.

In the embodiment as shown in FIG. 1, the restraint harness 10 is shaped to secure the lower portion of a child's body. More specifically, the body 60 of the restraint harness 10 is shaped to secure a toddler. The body 60 of the restraint harness 10 defines a plurality of openings to accommodate the appendages of an occupant. More specifically, there are two openings 63 located along a bottom half 66 configured to receive an occupant's legs and two openings 67 located along an upper half 68 of the restraint harness 10 for accommodating the occupant's arms.

The restraint material is a material configured to withstand loads that are exerted upon the restraint harness 10 by the occupant during operation of the vehicle 18. Specifically, the loads exerted upon the restraint 10 are created by the occupant during a sudden deceleration or stop of the vehicle 18. For example, in the event the vehicle 18 is an automobile, then the restraint material is configured to withstand loads that are experienced by passenger as the automobile is driven. Similarly, if the vehicle 18 is an aircraft, then the restraint material is configured to withstand loads that are experienced by a passenger during flight. The restraint material also includes sufficient flexibility to be folded into the stowed position in FIG. 2 and to also be tightened and flexed to secure an occupant. In one exemplary embodiment, the restraint material is a webbing constructed of ultra-high-molecular-weight polyethylene, nylon, or poly-para-phenylene terephthalamide. In another embodiment, the restraint material is a fabric constructed of an ultra-high-molecular-weight polyethylene laminated between two sheets of polyethylene terephthalate or, alternatively, biaxially-oriented polyethylene terephthalate.

The restraint harness 10 may include a fastener 70 for binding opposing ends 72 of the restraint harness 10 together. In the embodiment as shown in FIG. 1, the fastener 70 is a zipper positioned along a centerline of the restraint harness 10. However, it is to be appreciated that the fastener 70 may be placed in other locations of the restraint harness 10 as well. Furthermore, the fastener 70 may be any device for fastening two ends of fabric together such as, for example, hook-and-loop fasteners.

The restraint harness 10 is attached to a frame or other structural support of the seat 20 based on a variety of approaches that are illustrated in FIGS. 3A, 3B, 3C, 4, and 5. The structural support of the seat 20 is attached to a body or main support structure of the vehicle 18 (the main support structure of the vehicle 18 is not visible in the figures). The restraint harness 10 is configured to secure an occupant (e.g., a small child) in place. A load is exerted on the restraint harness 10 by the occupant. Specifically, the occupant creates the load in response to a sudden deceleration or stop of the vehicle 18. Accordingly, the loads created by the occupant are transmitted to the restraint harness 10, to the support structure of the seat 20, and to the main support structure of the vehicle 18.

In the embodiments as shown in FIGS. 3A, 3B, and 3C, the restraint harness 10 is releasably attached to the seat shell 64. That is, the structural support of the seat 20 is the seat shell 64, and the restraint harness 10 is releasably attached to the seat shell 64. Specifically, the tongue 32 of the restraint harness 10 is releasably attached to the latch 46, and the latch 46 is attached to the seat shell 64. In one embodiment, the latch 46 is an ISOFIX latch configured to secure a child seat, such as the restraint harness 10, in place.

Figure 4:
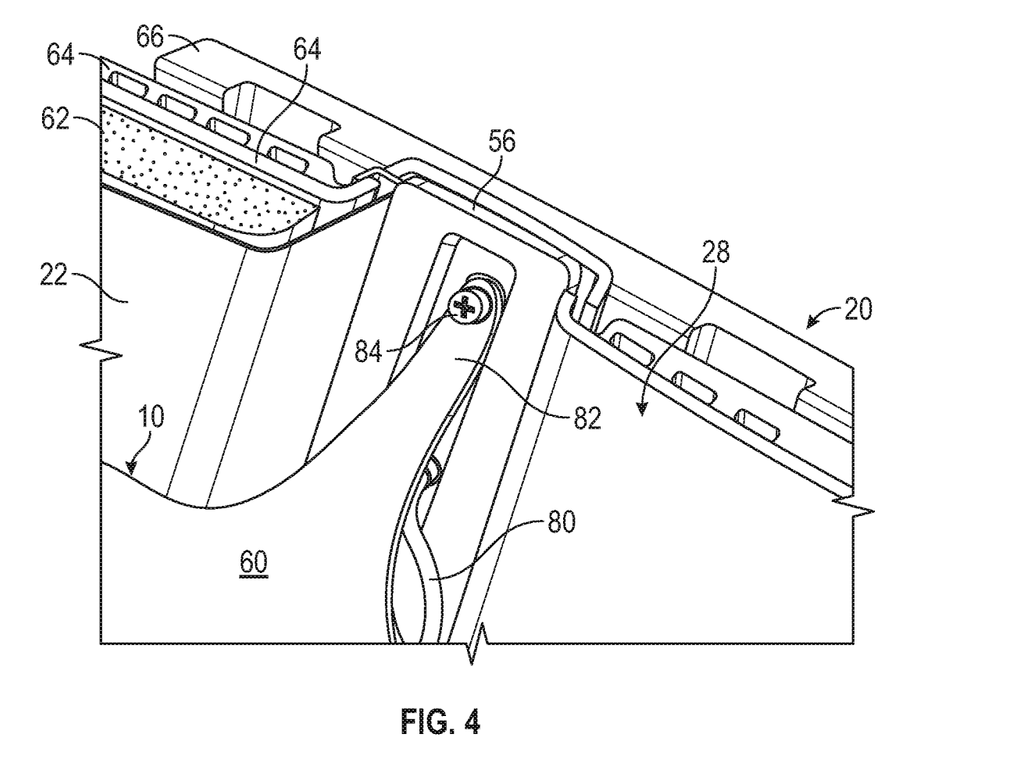
FIG. 4 is an illustration of the restraint harness attached to a support member of the vehicle seat according to an exemplary embodiment.
Figure 5:
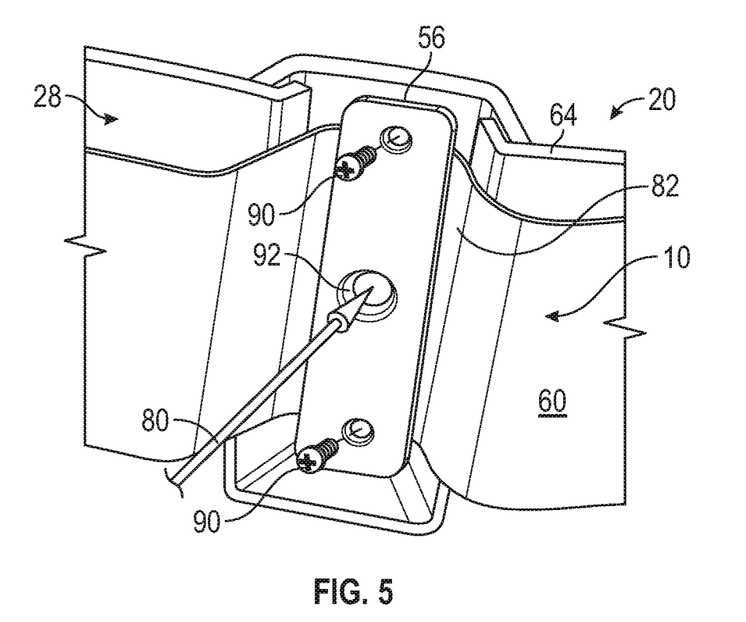
FIG. 5 illustrates an alternative approach to attach the restraint harness to the support member shown in FIG. 4 according to an exemplary embodiment.

In the embodiment as shown in FIGS. 4 and 5, the restraint harness 10 is fixedly attached to a spine member 56 of the seat 20. That is, the spine member 56 is the support structure of the seat 20. The spine member 56 extends in a substantially vertical direction along the back 28 of the seat 20 (FIG. 1). FIG. 4 includes a cross-sectioned view of the seat 20, which shows the seat trim 22 located on an exterior of the seat 20, seat foam 62 located directly underneath the seat trim 22, the seat shell 64 located directly underneath the seat foam 62, and a seat frame 66 supporting the seat shell 64. The spine member 56 is fixedly attached to or integrated with the seat frame 66.

Referring specifically to FIG. 4, in one embodiment the restraint harness 10 is fixedly attached to the spine member 56 of the seat 20 by both the body 60 and by a tensioning element 80. As explained below, the tensioning element 80 is part of a cable tightening system 120. The tensioning element 80 is configured to constrict or expand the body of the restraint harness 10 to securely fit an occupant's body. That is, the tensioning element 80 is configured to constrict or expand to secure an occupant in place within the restraint harness 10 without substantial discomfort to the occupant. In other words, the body 60 of the restraint harness 10 is not too tight to cause discomfort to an occupant, but at the same time holds the occupant securely so that the occupant may not slide or wiggle out of place.

The body 60 of the restraint harness 10 also defines an attachment portion 82, which is configured to attach to the support structure of the seat 20. For example, in the embodiments as shown in FIGS. 3A, 3B, and 3C, the attachment portion 82 of the body 60 is the tongue 32 (i.e., the tongue 32 attaches to the support structure of the seat 20). Turning back to FIG. 4, in another embodiment the attachment portion 82 of the body 60 is a portion of the restraint material. The restraint material (i.e., the attachment portion 82) of the body 60 of the restraint harness 10 is integrated or passes through an internal portion of the spine member 56, and a fastener 84 is used to secure the attachment between the body 60 of the restraint harness 10 and the spine member 56. The tensioning element 80 is also integrated or passes through an internal portion of the spine member 56 as well. The tensioning element 80 is also attached to a tensioning mechanism (i.e., the tightening mechanism 124 shown in FIG. 10).

In the embodiment as shown in FIG. 5, the attachment portion 82 of the body 60 of the restraint harness 10 is fixedly attached to the spine member 56 by a plate 88. Specifically, a portion of the restraint harness 10 is placed in between the plate 88 and the seat frame 66 and is secured in place by fasteners 90. The plate 88 defines an opening 92 that is shaped to receive the tensioning element 80. Specifically, as the tensioning element 80 is constricted, the body 60 of the restraint harness 10 constricts as well. The body 60 of the restraint harness 10 is eventually constricted into a size small enough to pass through and fit within an interior volume or space 102 (seen in FIG. 3C) of the seat 20. Referring now to FIG. 3C, the restraint harness 10 is eventually constricted in size to fit within the space 102 located between the seat shell 64 and the seat foam 62. Once the restraint harness 10 is constricted in size and is placed within the space 102 of the seat 20, the restraint harness 10 is now in the stowed position.

In the embodiment as shown in FIG. 6, the restraint harness 10 is slidably engaged with the structural support of the seat 20. Specifically, the body 60 of the restraint harness 10 is stretched or otherwise extends between two substantially vertical supports 95. In the embodiment as shown, the substantially vertical supports 95 each define a channel 96 that extends along a length 98 of the corresponding support 95. The substantially vertical supports 95 represent the attachment portion 82 of the restraint harness 10. The seat 20 includes a corresponding support member 100. The support member 100 is fixedly attached to the seat shell 64. In an exemplary embodiment, the support member 100 includes a substantially U-shaped profile. A U-shaped profile includes a segment having an arcuate or linear shape that is disposed in a substantially vertical direction and two substantially vertical segments. The vertical segments are disposed on the opposing ends of the segment.

The support member 100 defines two substantially vertical supports 104. The substantially vertical supports 104 are shaped to slidingly engage with a corresponding one of the substantially vertical supports 94 of the restraint harness 10. Specifically, the substantially vertical supports 104 each define a flange 108 that is shaped to slidingly engage with a corresponding channel 96 of one of the substantially vertical supports 95. However, it is to be appreciated that other approaches may be used to create the sliding engagement between the restraint harness 10 and the seat 20. Thus, in the embodiment as shown in FIG. 6, the substantially vertical supports 95 are the attachment portion 82 of the restraint harness 10, and the substantially vertical supports 95 are slidingly engaged with the support member 100. The seat shell 64, which is attached to the support member 100, is the structural support of the seat 20.

In the embodiment as shown in FIG. 6, the restraint harness 10 is not stowed within the seat 20. Instead, the restraint harness 10 may be removed from the seat 20 by sliding the restraint harness 10 in an upward direction until the substantially vertical supports 94 of the restraint harness 10 are no longer slidingly engaged with the substantially vertical supports 104 of the seat 20. However, in another embodiment an adult passenger may be able to sit on the seat 20 when the harness restraint 10 is still present, without any substantially interference or discomfort. This is because the restraint harness 10 is relatively flexible. Thus, when an adult passenger is seated, the restraint harness 10 deforms and is pushed up against the seat trim 22 (FIG. 2).

Figure 7:
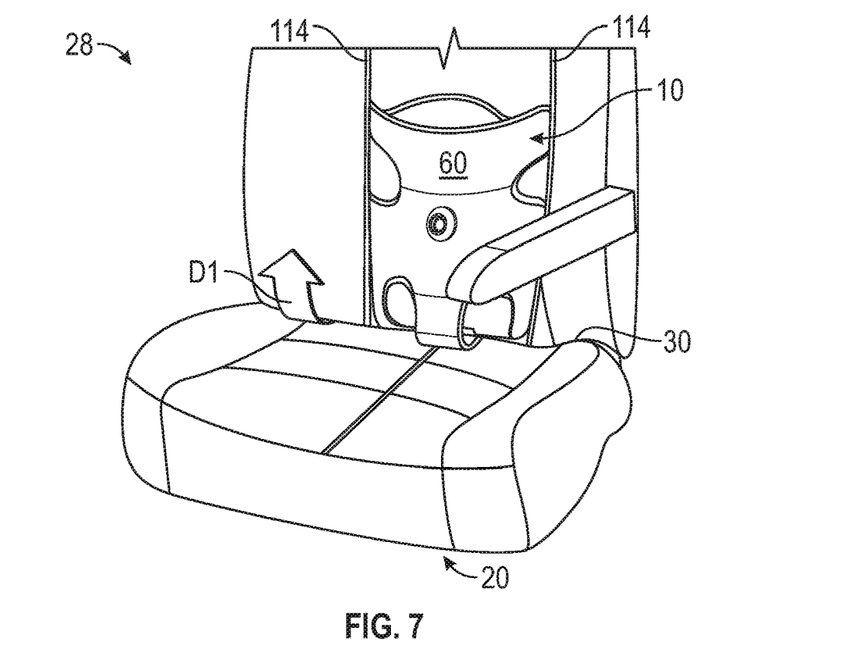
FIG. 7 illustrates an embodiment of the restraint harness in FIG. 6, where the restraint harness may be stored in the bight line of seat when in the stowed position according to an exemplary embodiment.

In another embodiment, the restraint harness 10 shown in FIG. 6 may be stored in the bight line 30 of the seat 20. Referring now to FIG. 7, in another embodiment the restraint harness 10 is configured to constrict into the bight line 30 of the seat 20 when not being used. In other words, the restraint harness 10 is configured to actuate into the stowed position by constricting into the bight line 30 of the seat 20 and is also configured to actuate back into the deployed position by extending upwardly and out of the bight line 30 of the seat 20.

The body 60 of the restraint harness 10 includes a mechanism (not visible in the figures) that is configured to slidingly engage and lock with two substantially vertical supports 114 fixedly attached to the back 28 of the seat 20. For example, the mechanism is configured to slide along the substantially vertical supports 114 and is then rotated about ninety degrees to lock in place. The vertical supports 114 are fixedly attached to the seat shell 64. Unlike the substantially vertical supports 104 shown in FIG. 6, the substantially vertical supports 114 extend into the bite line 30. Therefore, the restraint harness 10 may be urged in an upwards motion D1, and out of the bite line 30 by sliding along the substantially vertical supports 114, and into the deployed position as shown in FIG. 7.

Figure 8:
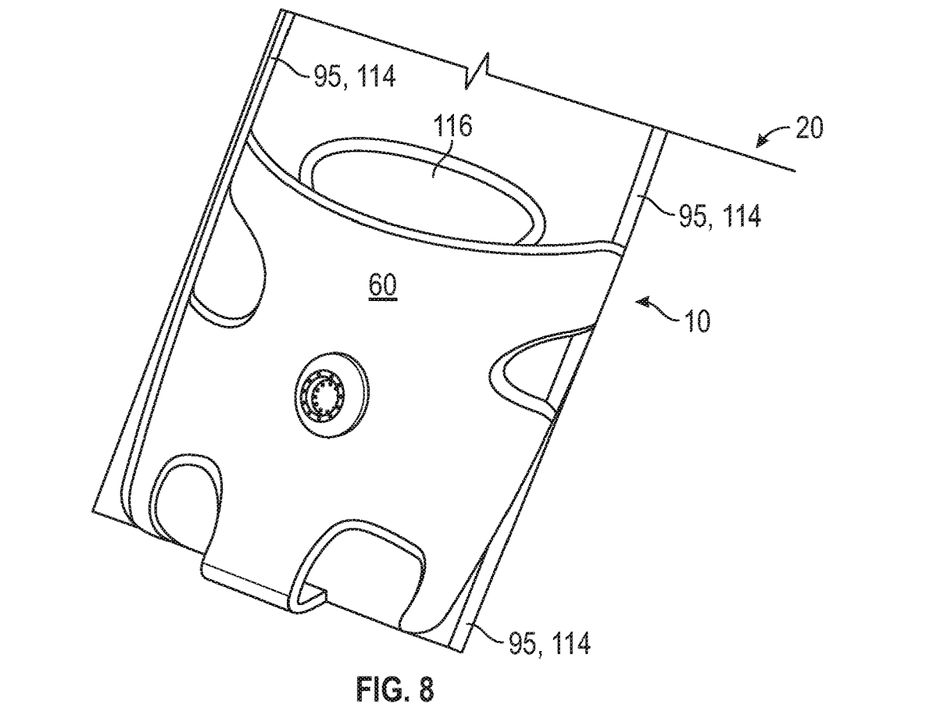
FIG. 8 is an illustration of the restraint harness in either FIG. 6 or 7 including an insert according to an exemplary embodiment.
Figure 9:
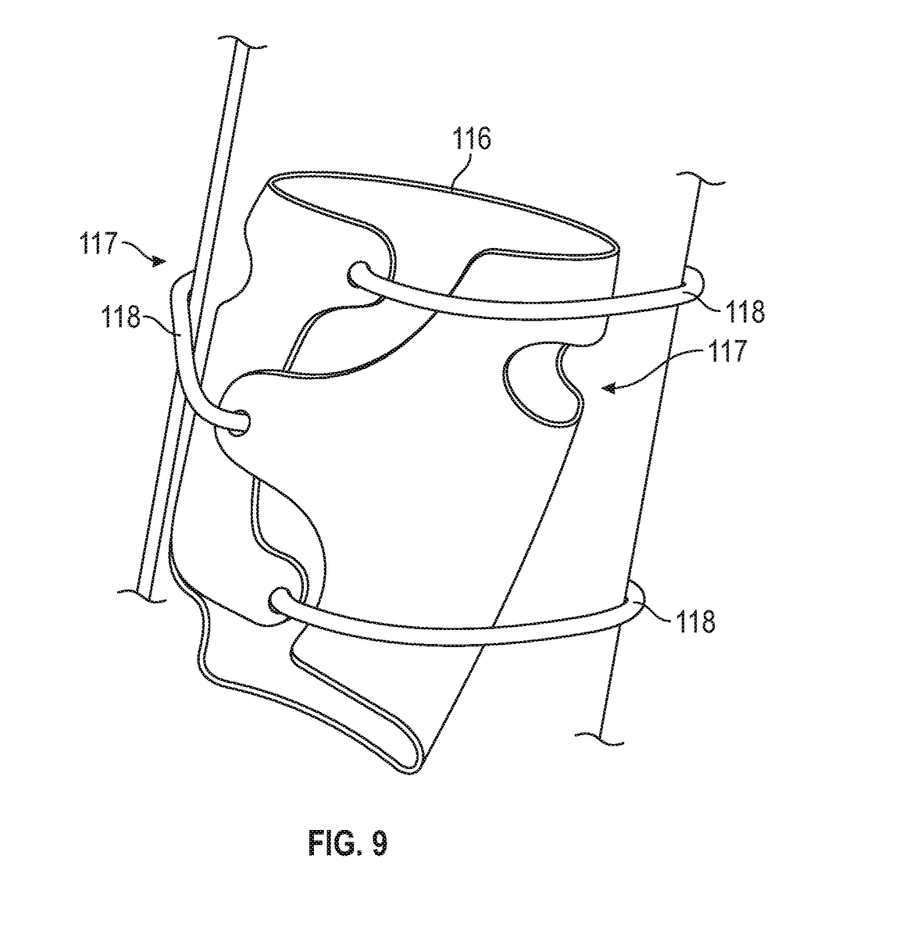
FIG. 9 is an alternative embodiment of the restraint harness shown in FIG. 8 according to an exemplary embodiment.

Referring now to FIG. 8, one embodiment, an additional insert 116 may be provided for either the restraint harness 10 shown in either of FIG. 6 or 7, where the body 60 of the restraint harness 10 is stretched or extends between the substantially vertical supports 95 or 114. The insert 116 is shaped to surround the lower body of the occupant's body, and thereby swaddles or envelopes at least a portion of the occupant's lower body. In an alternative embodiment as shown in FIG. 9, the insert 114 is attached to a plurality of cables 118 that are disposed on opposing sides 117 of the insert 116. The cables 118 are pulled or tensioned to create a more secure fit and are released to create more space to accommodate a larger occupant.

Figure 10:
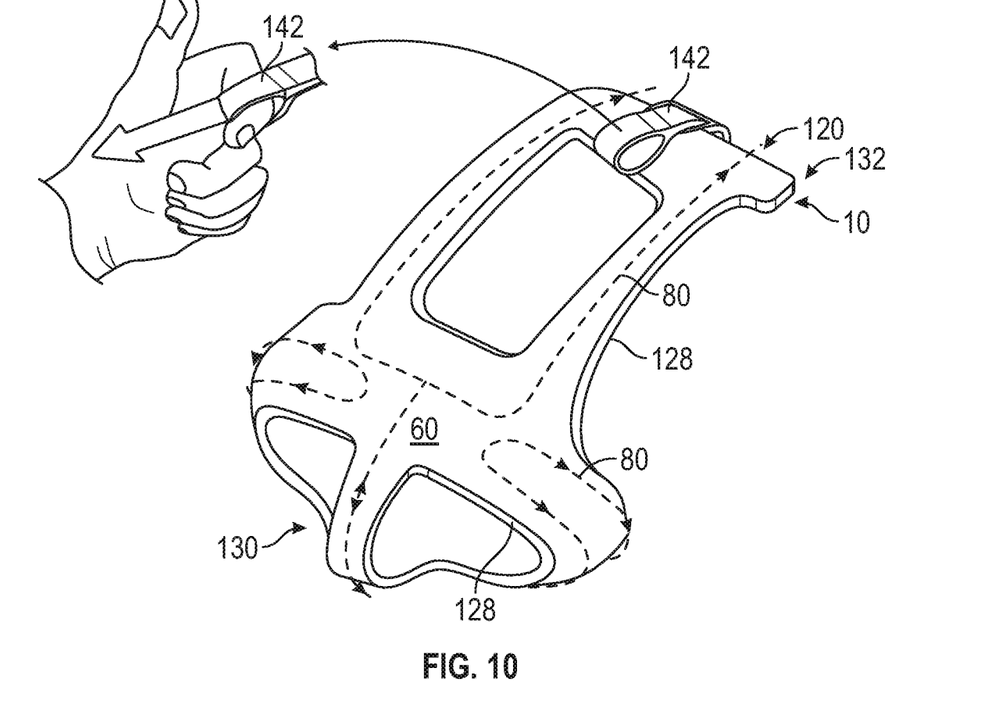
FIG. 10 is an illustration of the restraint harness having a cable tension system to constrict the harness according to an exemplary embodiment.
Figure 11:
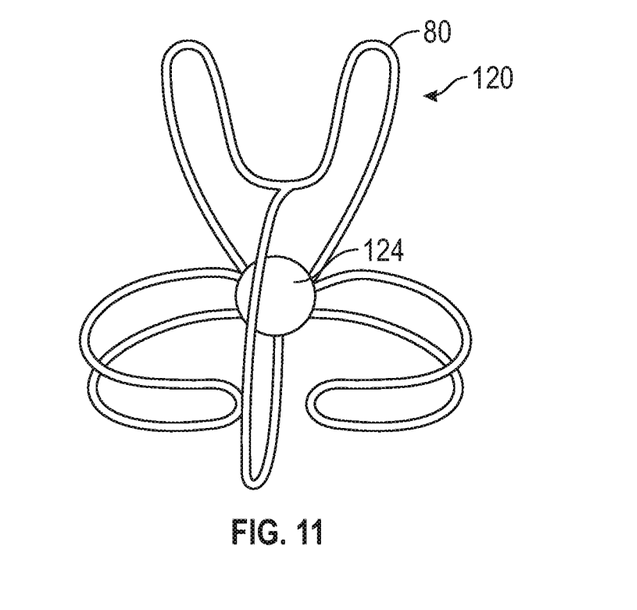
FIG. 11 is an illustration of the cable tension system according to an exemplary embodiment.
Figure 12:
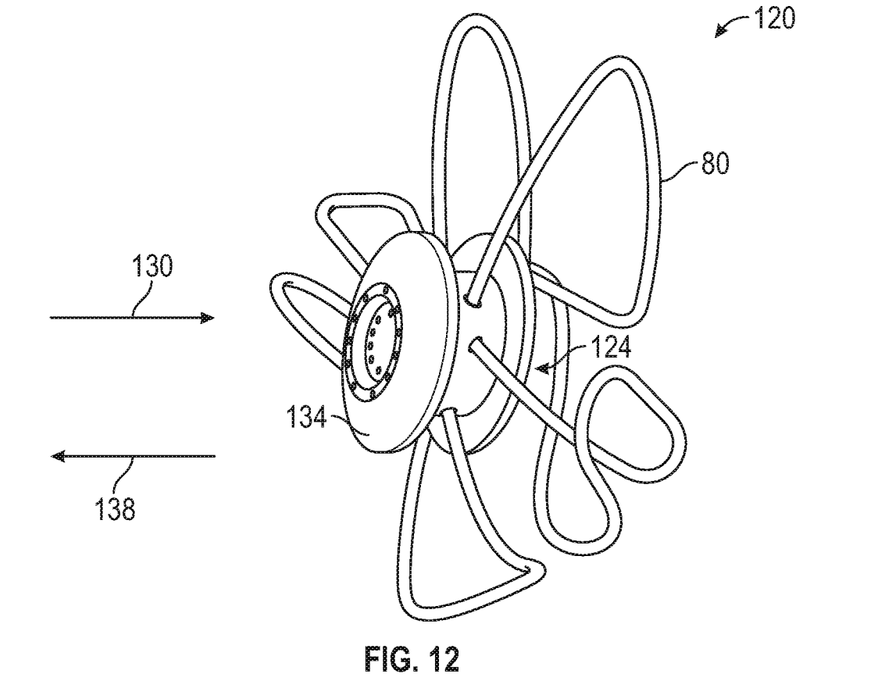
FIG. 12 is a side view of the cable tension system in FIG. 11 according to an exemplary embodiment.

Referring to FIGS. 10, 11, 12, 13, 14, 15, and 16, the cable tensioning system 120 is now described. The body 60 of the restraint harness 10 surrounds the lower half of an occupant's body and fits the occupant's body snugly, where the cable tensioning system 120 is configured to either constrict and expand the body 60 of the restraint harness 10 based on the size of an occupant's body. The cable tightening system 120 is also used to constrict the body 60 of the restraint harness 10 into the stowed position. Referring now to FIGS. 10, 11, and 12, the cable tightening system 120 includes one or more tensioning elements 80 and a tightening mechanism 124. The tensioning element 80 may be a continuous loop that extends around an outer periphery 128 of the body 60 of the restraint harness 10. Alternatively, in another embodiment, two tensioning elements 80 are provided and are arranged into a first loop configured to adjust a groin area 130 and second loop configured to adjust a shoulder area 132 of the body 60 of the restraint harness 10.

The tensioning elements 80 are placed within the body 60 of the restraint harness 10. Specifically, in one example the tensioning elements 80 are received by passageways inside the body 60 of the restraint harness 10 (not visible in the figures). The tensioning elements 80 are slidingly attached to the tightening mechanism 124. The tightening mechanism 124 is configured to constrict the tensioning elements 80, which results in retracting the body 60 of the restraint harness 10. In this way, an operator is able to constrict the body 60 of the restraint harness 10 to snugly fit an occupant. Referring specifically to FIG. 12, in one non-limiting embodiment the tightening mechanism 124 includes a knob 134 that is pushed inwardly in a direction 130 by an operator to engage. The knob 134 may then be rotated in either a clockwise or counterclockwise direction to constrict the tensioning elements 80. The knob 134 may be pushed outwardly in a direction 138 to release the tensioning elements 80.

Turning back to FIG. 10, in one embodiment the restraint harness 10 is actuated from the deployed position (seen in FIG. 10) and into the stowed position (FIG. 13) by pulling on a release cord 142 (FIG. 10). Specifically, the release cord 142 is connected to the cable tensioning system 120 and the tensioning elements 80. Therefore, when there is no occupant in the restraint harness 10, and when an operator pulls on or otherwise applies tension to the release cord 142, the restraint harness 10 then constricts in size. Eventually the body 60 of the restraint harness 10 is constricted and becomes small enough to fit within an opening 150 within the seat 20, which is seen in FIG. 13.

Figure 13:
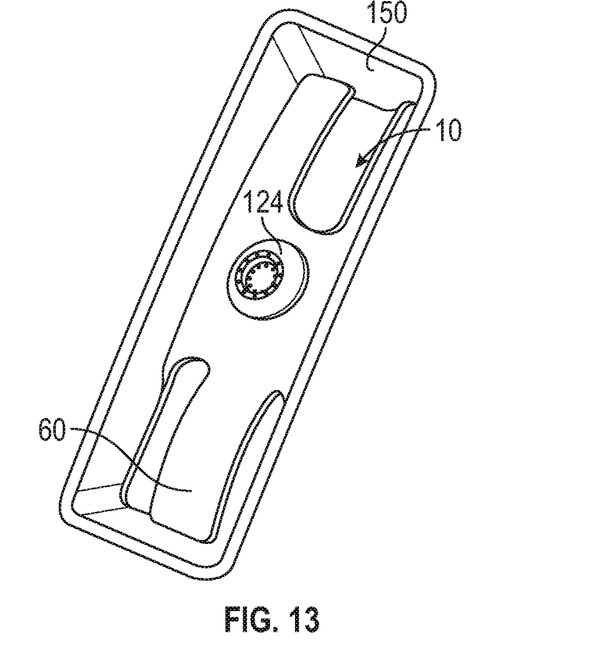
FIG. 13 illustrates a release button that is part of the cable tension system according to an exemplary embodiment.
Figure 14:
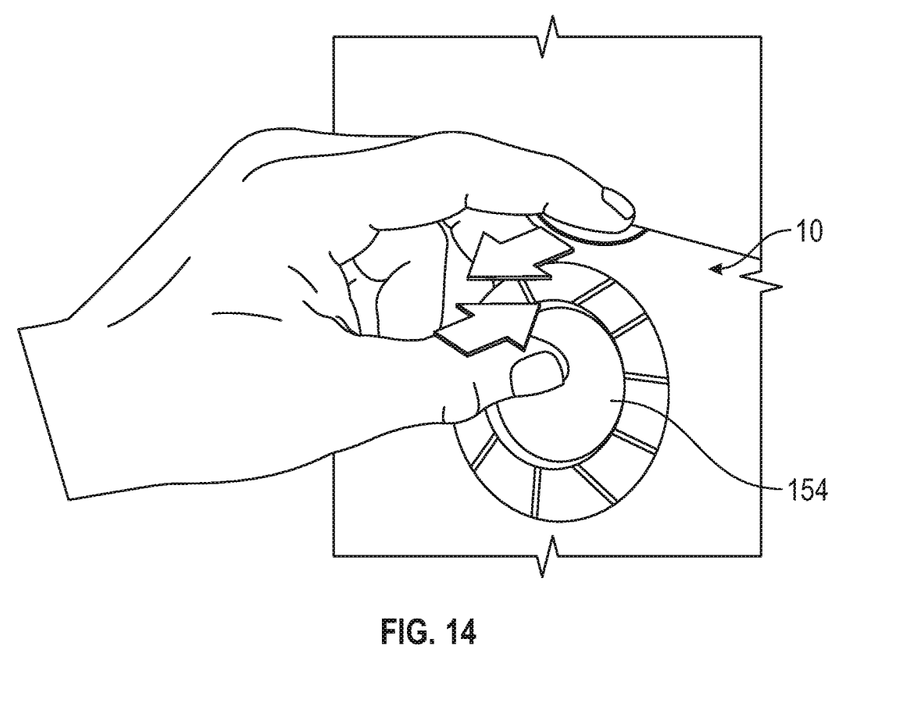
FIG. 14 is an illustration of the restraint harness shown in FIG. 10 in the stowed position within the seat according to an exemplary embodiment.

FIG. 13 is an illustration of the restraint harness 10 in FIG. 10 in a stowed position, and FIG. 14 is an illustration of a release button 152 for deploying the restraint harness 10 from the stowed position. Referring to both FIGS. 13 and 14, an operator may also actuate the restraint harness 10 from the stowed position seen in FIG. 13 and into the deployed position (seen in FIG. 10) by pressing the release button 152, while also pulling or otherwise applying a force upon the body 60 of the restraint harness 10.

Referring generally to the figures, the disclosed restraint harness provides several benefits and advantages. First, it is to be appreciated that many child car seats presently available tend to be bulky, and as a result may not be stored compactly within the vehicle. This creates an inconvenience for individuals attempting to use ride-sharing services when accompanied by a small child. The disclosed restraint harness alleviates these issues by providing individuals with a restraint harness may be stowed within the vehicle seat when not in use, but at the same time may be accessed when needed with relatively ease. Therefore, the disclosure provides a restraint harness that is especially beneficial in vehicles that are used for ride-sharing applications.

The disclosure also provides an approach for attaching the restraint harness to the main support structure of the vehicle. Accordingly, the loads created by the occupant during an abrupt stop or deceleration are transmitted from the restraint harness to the main support structure of the vehicle. Finally, unlike some harnesses that are presently used to secure individuals, the disclosed restraint harness is constructed of a material able to withstand loads experienced by an occupant. The material is also shaped to secure a body of the occupant, and more specifically to swaddle the lower occupant body. Therefore, any loads created by the occupant in response to sudden movement of the vehicle are distributed substantially evenly around the occupant's lower body.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A restraint harness for a vehicle, wherein the vehicle includes a seat having a structural support that is attached to a main support structure of the vehicle, the restraint harness comprising:

a body constructed of a restraint material, wherein the body is shaped to secure an occupant body and the restraint material is configured to withstand loads exerted upon the restraint harness by the occupant during operation of the vehicle;

an attachment portion that is configured to attach to the structural support of the seat, wherein the attachment portion of the restraint harness is a portion of the restraint material and the attachment portion of the restraint harness is configured to pass through an internal portion of a spine member, and wherein the spine member is the structural support of the seat; and a tensioning element configured to pass through the internal portion of the spine member.

2. The restraint harness of claim 1, wherein the attachment portion of the restraint harness is a tongue.

3. The restraint harness of claim 2, further comprising a receiver, wherein the tongue of the restraint harness is releasably attached to the receiver.

4. The restraint harness of claim 3, wherein the receiver is configured to attach to a seat shell, and wherein the seat shell is the structural support of the seat.

5. The restraint harness of claim 1, wherein the tensioning element is configured to constrict or expand the body of the restraint harness.

6. The restraint harness of claim 1, further comprising a pair of substantially vertical supports, wherein the body of the restraint harness extends between the substantially vertical supports.

7. The restraint harness of claim 6, wherein the substantially vertical supports are the attachment portion of the restraint harness.

8. The restraint harness of claim 1, wherein the body of the restraint harness defines a plurality of openings configured to accommodate appendages of the occupant.

9. The restraint harness of claim 1, wherein the restraint harness is configured to actuate from a stowed position and into a deployed position, and wherein the restraint harness is accessible when in the deployed position.

10. The restraint harness of claim 9, wherein the restraint harness is configured to actuate from the deployed position and back into the stowed position, wherein the restraint harness is no longer accessible when in the stowed position.

11. The restraint harness of claim 1, wherein the restraint harness is a child restraint harness.

12. A restraint harness for a vehicle, wherein the vehicle includes a seat having a structural support that is attached to a main support structure of the vehicle, the restraint harness comprising:

a body constructed of a restraint material, wherein the body is shaped to secure an occupant body and the restraint material is configured to withstand loads exerted upon the restraint harness by the occupant during operation of the vehicle;

an attachment portion that is configured to attach to the structural support of the seat; and a cable tightening system configured to constrict and expand the body of the restraint harness.

13. The restraint harness of claim 12, wherein the tensioning element is a continuous loop extending around an outer periphery of the body of the restraint harness.

14. The restraint harness of claim 12, further comprising two tensioning elements, wherein one of the tensioning elements are arranged into a first loop configured to adjust a groin area and a second tensioning element is arranged into a second loop configured to adjust a shoulder area of the body of the restraint harness.

15. A restraint harness for a vehicle, wherein the vehicle includes a seat having a structural support that is attached to a main support structure of the vehicle, the restraint harness comprising:
- a body constructed of a restraint material, wherein the body is shaped to secure an occupant body and the restraint material is configured to withstand loads exerted upon the restraint harness by the occupant during operation of the vehicle;
- an attachment portion that is configured to attach to the structural support of the seat, and
- wherein the restraint harness is configured to actuate into a stowed position by constricting into a bight line of the seat.

16. The restraint harness of claim 15, wherein the restraint is configured to actuate back into the deployed position by extending upwardly and out of the bight line of the seat.

* * * * *